J. W. SCHMEH.
STORM CURTAIN FOR VEHICLES.
APPLICATION FILED MAR. 2, 1916.

1,204,495.

Patented Nov. 14, 1916.

INVENTOR
John W. Schmeh,
by Geyer Popp
ATTORNEYS.

UNITED STATES PATENT OFFICE.

JOHN W. SCHMEH, OF BUFFALO, NEW YORK.

STORM-CURTAIN FOR VEHICLES.

1,204,495.　　　Specification of Letters Patent.　　Patented Nov. 14, 1916.

Application filed March 2, 1916. Serial No. 81,643.

*To all whom it may concern:*

Be it known that I, JOHN W. SCHMEH, a citizen of the United States, residing at Buffalo, in the county of Erie and State of New York, have invented new and useful Improvements in Storm-Curtains for Vehicles, of which the following is a specification.

This invention relates to a storm curtain designed more particularly for motor trucks but the same is also applicable to other vehicles of various kinds. When the wheels of such a truck or similar vehicle pass over obstructions or enter depressions in the pavement, the vehicle top is bent or distorted more or less, racking and straining the storm curtain and frequently stripping it from its fastenings and cracking or breaking its window panes.

The object of my invention is the provision of a simple and inexpensive curtain of this character which while fully protecting the driver is capable of accommodating itself to the relative movements and vibrations of the vehicle-top and body, thus avoiding undue strain upon the curtain or its windows and preventing tearing or breakage thereof.

Figure 1:
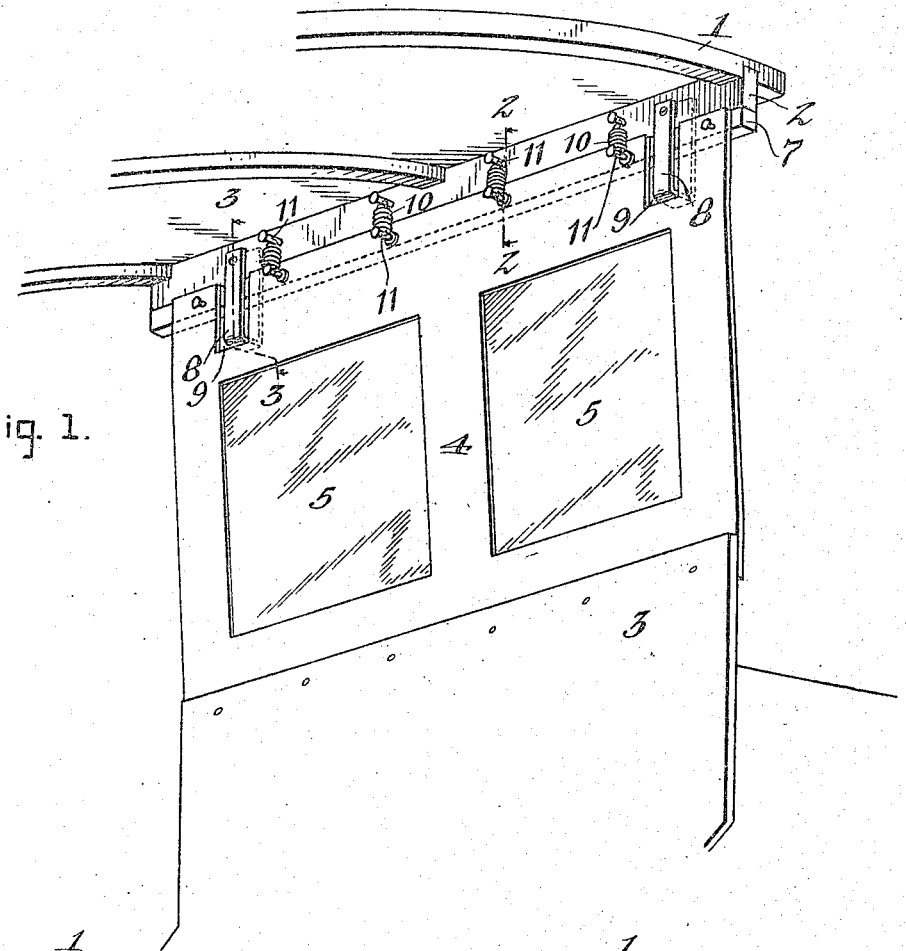
Figure 2:
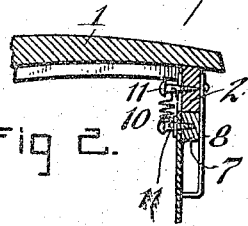
Figure 3:
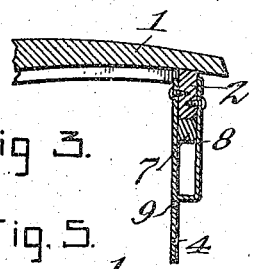
Figure 4:
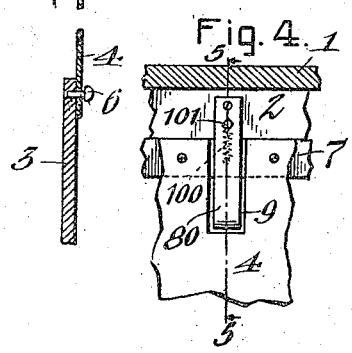
Figure 5:
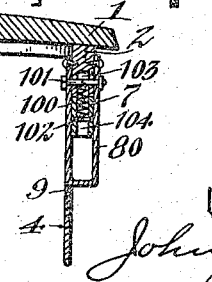

In the accompanying drawings, Figure 1 is an interior perspective view of the front portion of an automobile truck equipped with the curtain. Figs. 2 and 3 are transverse vertical sections on the correspondingly numbered lines in Fig. 1. Fig. 4 is a sectional rear view of the vehicle-top, showing a modified construction of the improvement. Fig. 5 is a transverse vertical section on line 5—5, Fig. 4.

Similar characters of reference indicate corresponding parts throughout the several views.

Referring to the construction shown in Figs. 1 to 3, 1 indicates the usual overhanging top of the automobile body provided near its front edge with the customary transverse rail 2. 3 indicates the dash or equivalent stationary part of the vehicle below the top, and 4 the storm curtain which closes the space between the top and the dash. This curtain may have the usual leather body portion and one or more panes 5 of mica or other transparent material. The lower edge of the curtain may be detachably secured to the top of the dash by any suitable means, such as buttons 6 secured to the dash and passing through holes in the curtain. The upper edge of the curtain is attached to a cross bar 7 which is free to play up and down to a limited extent in suitable guides 8 carried by the top. The preferred guides shown in the drawings consist of U-shaped straps depending from the rail 2 and rigidly fastened to it at their upper ends. These guides are arranged at a short distance from the ends of the rail and the curtain is provided in its adjacent portions with notches or recesses 9 which receive the lower portions of the guides. Connecting the bar 7 with the rail 2, or equivalent member of the top, are tension springs 10 which stretch the curtain vertically and permit its upper portion to yield and accommodate itself to the twisting movements of the top relative to the vehicle-body when the wheels pass over obstructions or sink into depressions of the road. In the construction shown, coiled upright springs are employed which are fastened at their upper and lower ends to the rail 2 and the curtain bar 7 by screws 11 or other suitable means.

The guides 8, while allowing the upper part of the curtain to play vertically on the vehicle-top, hold the bar 7 and the attached curtain against forward and backward displacement on the top, thereby reliably retaining the curtain in position to protect the driver. For this purpose, said bar is closely fitted between the front and rear members of the guides, as best shown in Figs. 2 and 3.

As shown, the tension springs 10 are preferably located on the inner side of the curtain, where they are largely hidden from view.

Instead of arranging the springs outside of the guides, they may be placed within them to practically conceal the springs, as shown in Figs. 4 and 5. In this case, a spring 100 is arranged within each guide 80 and the ends of the spring are respectively secured to the rail 2 and the bar 7 by transverse pins or bolts 101, 102, the upper bolt preferably serving to fasten both the spring and the legs of the corresponding guide to the rail, producing a very simple construction. A greater or less number of such guides and springs may be employed, according to the dimensions of the curtain. As shown, the springs are seated in opposing sockets 103, 104, in the rail 2 and the bar 7.

By this improved construction, the curtain is reliably held in its normal position and its upper portion is at the same time permitted to come and go with the vehicle top, as above described, avoiding injurious strain on the curtain, keeping it and its panes intact and increasing its durability accordingly. While possessing these advantages, the guide and tension devices of the curtain are simple in construction and can be applied to old as well as new vehicles at small cost.

I claim as my invention:

1. The combination of a vehicle top having a transverse front rail, a support below said rail, vertical guides carried by said rail and extending below the same, a storm-curtain adapted to be attached at its lower edge to said support and having its upper portion engaged with said guides to play vertically thereon, said guides being constructed to hold the curtain from forward and backward displacement relatively to said rail, and springs for drawing the upper portion of said curtain toward said rail.

2. The combination with a vehicle top and a support below the same, of guides mounted on the top, a storm-curtain adapted to be attached to said support, a cross bar attached to the upper portion of the curtain and slidable vertically in said guides, and tension-springs connecting said bar with the top for holding the curtain in its normal stretched condition.

3. The combination with a vehicle top and a support below the same, of U-shaped guides depending from the vehicle top, a cross bar slidable vertically in said guides but confined against movement fore and aft of the vehicle top, a storm-curtain adapted to be attached at its lower edge to said support and secured at its upper edge to said cross bar, and tension-springs connecting said cross bar with the vehicle-top.

4. The combination with a vehicle-top and a support below the same, of fixed guides depending from the top, a cross bar slidable vertically in said guides, a storm-curtain adapted to be attached at its lower edge to said support and having its upper edge attached to said cross bar, the curtain being provided in its upper portion with notches to receive said guides, and upright tension-springs attached at their upper ends to the vehicle-top and at their lower ends to said cross bar.

5. The combination with a vehicle-top and a support below the same, of guides mounted on the top, a storm-curtain adapted to be attached to said support, a cross bar attached to the upper portion of the curtain and slidable vertically in said guides, and a tension spring arranged within each guide and connecting said bar with the top.

6. The combination with a vehicle-top and a support below the same, of U-shaped guides depending from the vehicle-top, a cross bar slidable vertically in said guides, a storm curtain adapted to be attached at its lower edge to said support and secured at its upper edge to said cross bar, and an upright tension spring arranged within each guide and secured at its ends to the top and said cross bar.

7. The combination with a vehicle-top and a support below the same, of guides arranged on the vehicle-top, a cross bar slidable vertically in said guides, a storm-curtain adapted to be attached at its lower edge to said support and secured at its upper edge to said cross bar, the latter and the top having opposing sockets arranged within the dimensions of said guides, and tension springs seated in said sockets and secured at their ends to the top and the cross bar.

JOHN W. SCHMEH.

Copies of this patent may be obtained for five cents each, by addressing the "Commissioner of Patents, Washington, D. C."